(12) United States Patent
Gerard et al.

(10) Patent No.: US 9,300,709 B2
(45) Date of Patent: Mar. 29, 2016

(54) METHOD OF TRANSMISSION OF A DIGITAL CONTENT STREAM AND CORRESPONDING METHOD OF RECEPTION

(75) Inventors: François Gerard, Beignon (FR); Denis Mischler, Thorigne Fouillard (FR); Jean-Baptiste Henry, Melesse (FR)

(73) Assignee: Thomson Licensing (FR)

( * ) Notice: Subject to any disclaimer, the term of this patent is extended or adjusted under 35 U.S.C. 154(b) by 937 days.

(21) Appl. No.: 12/589,610

(22) Filed: Oct. 26, 2009

(65) Prior Publication Data

US 2010/0107202 A1 Apr. 29, 2010

(30) Foreign Application Priority Data

Oct. 27, 2008 (EP) .................................... 08305737

(51) Int. Cl.
| | | |
|---|---|---|
| *H04N 7/173* | (2011.01) | |
| *H04L 29/06* | (2006.01) | |
| *H04N 21/242* | (2011.01) | |
| *H04N 21/43* | (2011.01) | |
| *H04N 7/171* | (2011.01) | |
| *H04N 7/52* | (2011.01) | |

(52) U.S. Cl.
CPC ............ *H04L 65/4084* (2013.01); *H04L 65/80* (2013.01); *H04N 7/1713* (2013.01); *H04N 7/17318* (2013.01); *H04N 7/52* (2013.01); *H04N 21/242* (2013.01); *H04N 21/4305* (2013.01); *H04N 21/4307* (2013.01)

(58) Field of Classification Search
None
See application file for complete search history.

(56) References Cited

U.S. PATENT DOCUMENTS

| | | | |
|---|---|---|---|
| 6,938,268 | B1 | 8/2005 | Hodge |
| 7,020,891 | B1 * | 3/2006 | Lippincott ...................... 725/87 |
| 8,943,218 | B2 * | 1/2015 | Malaby ............... H04L 67/1097 348/E5.008 |
| 2002/0112244 | A1 | 8/2002 | Liou et al. |
| 2004/0061805 | A1 * | 4/2004 | Shibamiya et al. ........... 348/565 |

(Continued)

FOREIGN PATENT DOCUMENTS

| | | |
|---|---|---|
| CA | 2234033 | 10/1999 |
| CN | 1474540 | 2/2004 |

(Continued)

OTHER PUBLICATIONS

Search Report dtd. Jun. 10, 2009.

(Continued)

*Primary Examiner* — Jonathan V Lewis
(74) *Attorney, Agent, or Firm* — Jack Schwartz & Associates, PLLC

(57) ABSTRACT

The invention concerns a method of transmission of a digital content stream to receivers and a corresponding method of reception. In order to synchronize digital content rendering over these receivers, while supporting trick mode commands, the method of transmission comprises a step of sending of a common time reference to the receivers, a step of reception of a trick mode command message, the received trick mode command message comprising information allowing identification of a point in the digital content stream, a step of sending of notification messages to all of the at least two receivers notifying them of the received trick mode command message and a step of sending of at least part of the digital content stream to all receivers in accordance with the received trick mode command message, the digital content stream comprising information allowing to identify a point in the digital content stream.

30 Claims, 7 Drawing Sheets

(56) References Cited

U.S. PATENT DOCUMENTS

| | | | |
|---|---|---|---|
| 2004/0117840 A1* | 6/2004 | Boudreau | G09B 5/065 725/98 |
| 2004/0226047 A1* | 11/2004 | Lin et al. | 725/109 |
| 2004/0228367 A1* | 11/2004 | Mosig | H04L 29/06027 370/503 |
| 2005/0064858 A1 | 3/2005 | Makela et al. | |
| 2005/0177853 A1* | 8/2005 | Williams et al. | 725/81 |
| 2006/0277581 A1* | 12/2006 | Eliyahu et al. | 725/88 |
| 2007/0160970 A1 | 7/2007 | Kaplan | |
| 2008/0162668 A1 | 7/2008 | Miller | |
| 2008/0195777 A1 | 8/2008 | Dickens et al. | |
| 2009/0210300 A1* | 8/2009 | Cansler et al. | 705/14 |

FOREIGN PATENT DOCUMENTS

| | | |
|---|---|---|
| CN | 1972232 | 5/2007 |
| FR | 2908584 | 5/2008 |
| GB | 2 428 830 A | 2/2007 |
| GB | 2428830 | 2/2007 |
| JP | 2002247541 | 8/2002 |
| JP | 2005294941 | 10/2005 |
| JP | 2007104193 | 4/2007 |
| JP | 2008167351 | 7/2008 |
| WO | WO 99/46702 | 9/1999 |

OTHER PUBLICATIONS

Suhit Gupta et al. "P2P Video Synchronization in a Collaborative Vitrutal Environment" pp. 1-20, Advances in Web-Based Learning-ICWL 2005. 4th International Conference. Proceedings, Hong Kong, China, Jul. 31-Aug. 3, 2005.

Yutaka Ishibashi et al., "A Performance Compairson of Media Sychronization Schemes for Collaborative Systems in an Interconnected ATM-Wireless LAN", Department of Electrical and Computer Engineering, pp. 265-271, 0-708-487219/1998, IEEE.

A Odorizzi et al., P3P: A P2P Overlay Multicast Network for Multimedia Streaming, Nolta 2006, Sep. 11-14, Bologna Italy, pp. 963-966.

Dan Phung et al. "Adaptive internet interactive team video", Advances in Web-Based Learning-ICWL 2005. 4th International Conference. Proceedings, Hong Kong, China, Jul. 31-Aug. 3, 2005.

H. Schulzzrinne, et al., "Real Time Portocol (RTSP)", Apr. 1998 pp. 1-81, http:www.ietf.org/rfc/rfc2326.txt.

H. Schulzzrinne, et al., RTP: A Transport Protocol for Real-Time Applications, Jul. 2003, pp. 1-91, http:www.rfc-base.org/txt/rfc-3350.txt.

* cited by examiner

METHOD OF TRANSMISSION OF A DIGITAL CONTENT STREAM AND CORRESPONDING METHOD OF RECEPTION

This application claims the benefit, under 35 U.S.C. §119 of European Patent Application 08305737.2, filed Oct. 27, 2008.

1. FIELD OF INVENTION

The invention relates to the field of transmission of digital content stream and to the field of reception of a digital content stream. More specifically, the invention relates to a method of transmission of a digital content stream to multiple receivers and a corresponding method of reception, with support of trick mode commands on the digital content from all receivers.

A digital content stream comprises an audio only, a video only, and a video stream comprising audio, as well as multimedia streams, comprising video with or without audio and audio streams, destined to be recorded and played back.

2. TECHNICAL BACKGROUND

According to prior art, content delivered to a receiver in the context of content-on-demand such as video-on-demand (VoD) is delivered through a one-to-one connection with a VoD server, for example by using IP (Internet Protocol) unicast distribution. This one-to-one distribution model is opposed to a one-to-many distribution model, where a same digital content source is received at the same time by many receivers.

The one-to-one distribution model allows a receiver to intervene on the unrolling of the digital content by issuing so-called trick mode commands. Trick mode commands comprise actions such as play, stop, pause, fast reverse, fast forward a digital content and go to chapter in a digital content. In this distribution model, it is the receiver that commands the streaming of a digital content through a one-to-one connection with a digital content server. While this distribution model allows trick mode commands, the model does not allow for synchronization between receivers, that is: rendering a same image from a same digital content stream at the same time on different receivers.

In the one-to-many distribution model, it is the distribution server that commands the digital content streaming. The one-to-many distribution model is used to distribute a same digital content stream to a large audience, for example to distribute TV or radio programs. With this distribution model, trick mode commands are not allowed, or only allowed for one receiver. Synchronization between the digital content streams distributed over receivers is inherent to the distribution model, because a same digital content stream is delivered at the same time to many receivers, for example by using IP multicast distribution.

The above described distribution models are convenient for Video-on-Demand applications and digital content or television broadcasting. However, the above described distribution models do not allow combining a one-to-many distribution with the support of trick mode commands from several receivers. One of the problems that need to be solved when trick mode commands from several receivers are to be supported in a one-to-many digital content stream distribution model is the synchronization of the rendering of images from the digital content stream between the receivers.

According to prior art, synchronization of rendering of a digital content over multiple receivers with support of trick mode commands is applied in the context of, for example, e-learning applications, where students each have a receiver and can issue trick mode commands to intervene on the unrolling of a course. According to prior art, the course is distributed through prior downloading on the receiver of each student, and synchronization of the content rendering between receivers is done by synchronization of the playback of the locally stored digital contents. However, synchronizing the rendering of a digital content amongst receivers that have the digital content stored locally is not the same thing as synchronizing the rendering of a digital content that is streamed from a central source.

Current state of the art does not allow a one-to-many digital content stream distribution with support of trick mode commands and synchronized digital content rendering.

3. SUMMARY OF THE INVENTION

The present invention aims at alleviating the inconveniences of prior art.

In particular, the objective of the present invention is to allow a digital content stream distribution destined to at least two receivers with support of digital content trick modes and synchronized digital content rendering.

The invention relates more particularly to a method of transmission of a digital content stream to at least two receivers, comprising the following steps:

sending of a common time reference to all of the at least two receivers;

reception of a trick mode command message, called received trick mode command message, the received trick mode command message comprising information allowing identification of a point in the digital content stream;

sending of notification messages to all of the at least two receivers notifying them of the received trick mode command message;

sending of at least part of the digital content stream to all of at least two receivers in accordance with the received trick mode command message, the digital content stream comprising information allowing to identify a point in the digital content stream.

According to a particular embodiment of the invention, the method further comprises the following steps:

sending of a scheduling message to all of the at least two receivers in accordance with the received trick mode command message, the scheduling message comprising information to render a determined point in the digital content stream at a determined value of the common time reference;

receiving of notification messages, called 'top ok' messages, from at least one of the at least two receivers indicating that it has determined that it is ready to render the determined point in the digital content stream at the determined value of the common time reference.

According to a particular embodiment of the invention, the method further comprises the following steps:

an estimation of a time needed to fill a digital content reception buffer of the at least one of the two receivers and a determination, that the at least one of the at least two receivers is ready to render the determined point in the digital content stream at the determined value of the common time reference, that is based on the estimation.

According to a particular embodiment of the invention, the method further comprises the following steps:

stopping the sending of the at least a part of the digital content stream to all of the at least two receivers if the received trick mode command message is a command to stop a sending of the digital content stream, According to a particular embodiment of the invention, the method further comprises the following steps:

when no the notification message has been received within a determined period of time from all of the at least two receivers, a new scheduling message is sent wherein the determined value of the common time reference of a previous scheduling message is increased with a determined increase value, and the sending of the at least a part of the digital content stream is restarted from a point comprised in the received trick mode command message.

According to a particular embodiment of the invention, the method further comprises a step of determining the determined increase value from measurements obtained from previous reception of 'top ok' messages.

According to a particular embodiment of the invention, the method further comprises the following steps, implemented by a receiver:

reception of a time reference;

sending of a trick mode command message, the trick mode command message comprising information allowing identification of a point in the digital content stream;

reception of a notification message notifying the receiver that a trick mode command message is received from a receiver, called received notification message;

reception of a digital content stream in accordance with the received notification message, the digital content stream comprising the information allowing identification of a point in the digital content stream.

According to a particular embodiment of the invention, the method further comprises the following steps:

reception of a scheduling message, the scheduling message comprising information to render a determined point in the digital content stream at a determined value of the time reference;

sending of a notification message indicating that the receiver has determined that it is ready to render the determined point in the digital content stream at the determined value of the time reference.

According to a particular embodiment of the invention, a determination that the receiver is ready to render the determined point in the digital content stream at the determined value of the time reference is based on an estimation of a time needed to fill a digital content reception buffer of the receiver.

According to a particular embodiment of the invention, the point in the digital content stream identifies a transport packet used to transport the digital content stream.

According to a particular embodiment of the invention, the point in the digital content stream identifies an image.

According to a particular embodiment of the invention, the point in the digital content stream identifies an audio frame.

4. LIST OF FIGURES

More advantages of the invention will appear through the description of particular, non-restricting embodiments of the invention. The embodiments will be described with reference to the following figures.

5. DETAILED DESCRIPTION OF THE INVENTION

Figure 1:
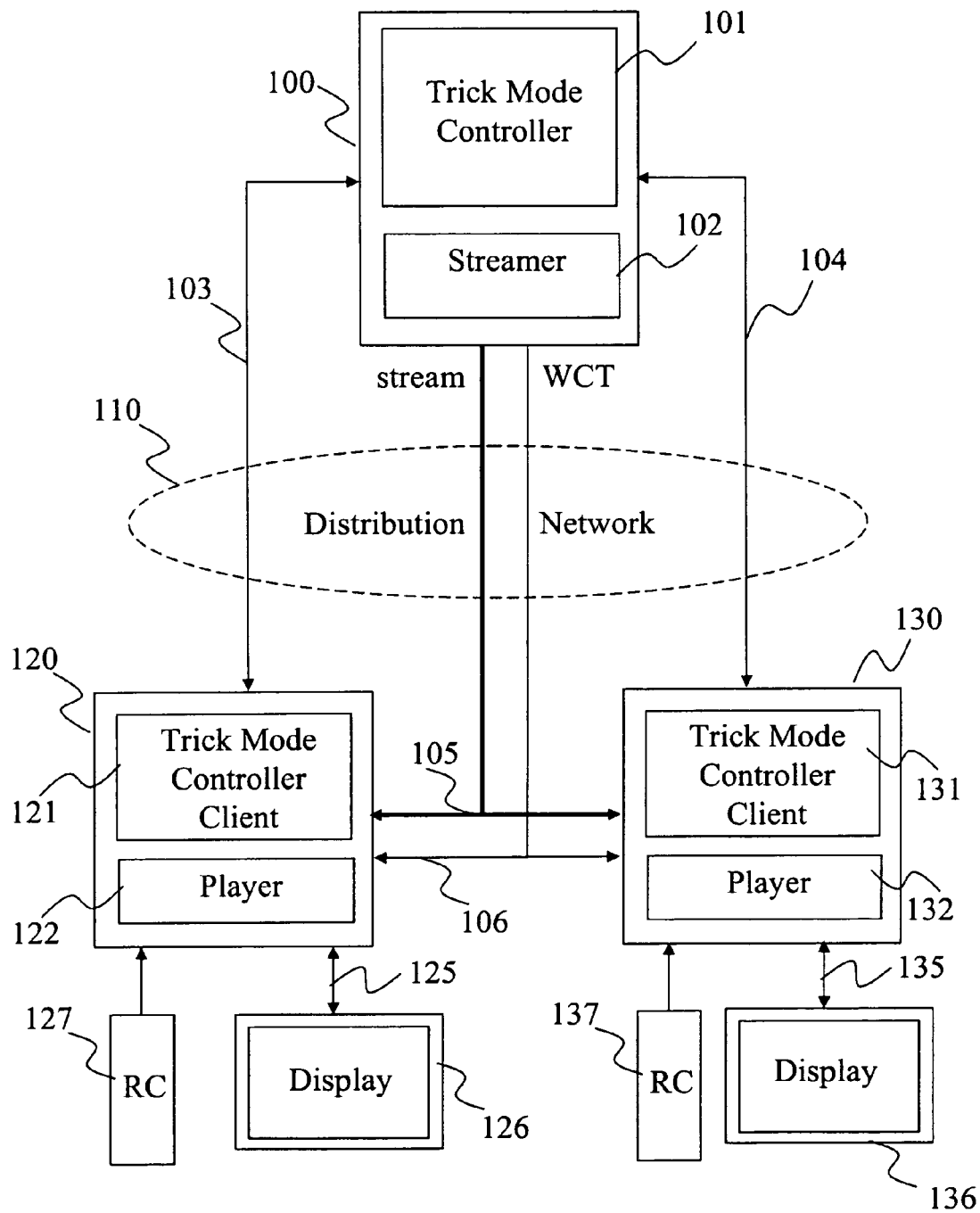
FIG. 1 shows an example network infrastructure that is compatible with the invention.

FIG. 1 shows an example network infrastructure that is compatible with the invention according to the methods of transmission and reception of the invention.

The infrastructure 1 comprises:

a digital content distribution server 100;
a receiver A 120;
a receiver B 130;
These devices are interconnected by a distribution network 110.

The digital content distribution server 100 comprises:
a digital content trick mode controller 101 and
a digital content streamer 102.

The receiver A 120 (respectively B 130) comprises:
a trick mode control client 121 (respectively 131), and
a player 122 (respectively 132).

The receiver A 120 (respectively B 130) is further equipped with:
a display for showing digital content and graphics 126 (respectively 136); and
an input device 127 (respectively 137).

Digital content trick mode controller 101 receives trick mode command messages and notifications from receivers A 120 and B 130 through connections respectively 102 and 104. Digital content trick mode controller 101 also sends notification messages to the two receivers 120 and 130 notifying them of a received trick mode command message through these connections 102 and 104. Digital content distribution server further sends a common time reference to both receivers 120 and 130 through connection 106. Digital content streamer 102 sends a digital content stream in accordance with the received trick mode command message over connection 105.

Receivers 120 and 130 receive the common time reference that is sent by digital content distribution server 100. Furthermore, they send trick mode command messages over connections respectively 103 and 104 to the digital content distribution server 100. These messages comprise information allowing identifying a point in the digital content stream from digital content streamer 102. They receive notification messages notifying them that a trick mode command message is received from a receiver, by digital content trick mode controller 101. They receive a digital content stream in accordance with the received trick mode command message, whereby the digital content stream comprises information allowing identifying a point in said digital content stream. Receivers 120 and 130 also comprise a digital content trick mode controller (121, respectively 131). These digital content trick mode controllers 121 and 131 exchange messages and notifications the method of transmission and the method of reception according to the invention with the digital content trick mode controller 101 of the digital content distribution server 100. The digital content stream received by receivers 120 and 130 is rendered on display device 126 and respectively 136. According to a variant embodiment, users of receivers 120 and 130 interact with the receivers 120 and 130 by means of input device respectively 127 and 137.

Figure 2:
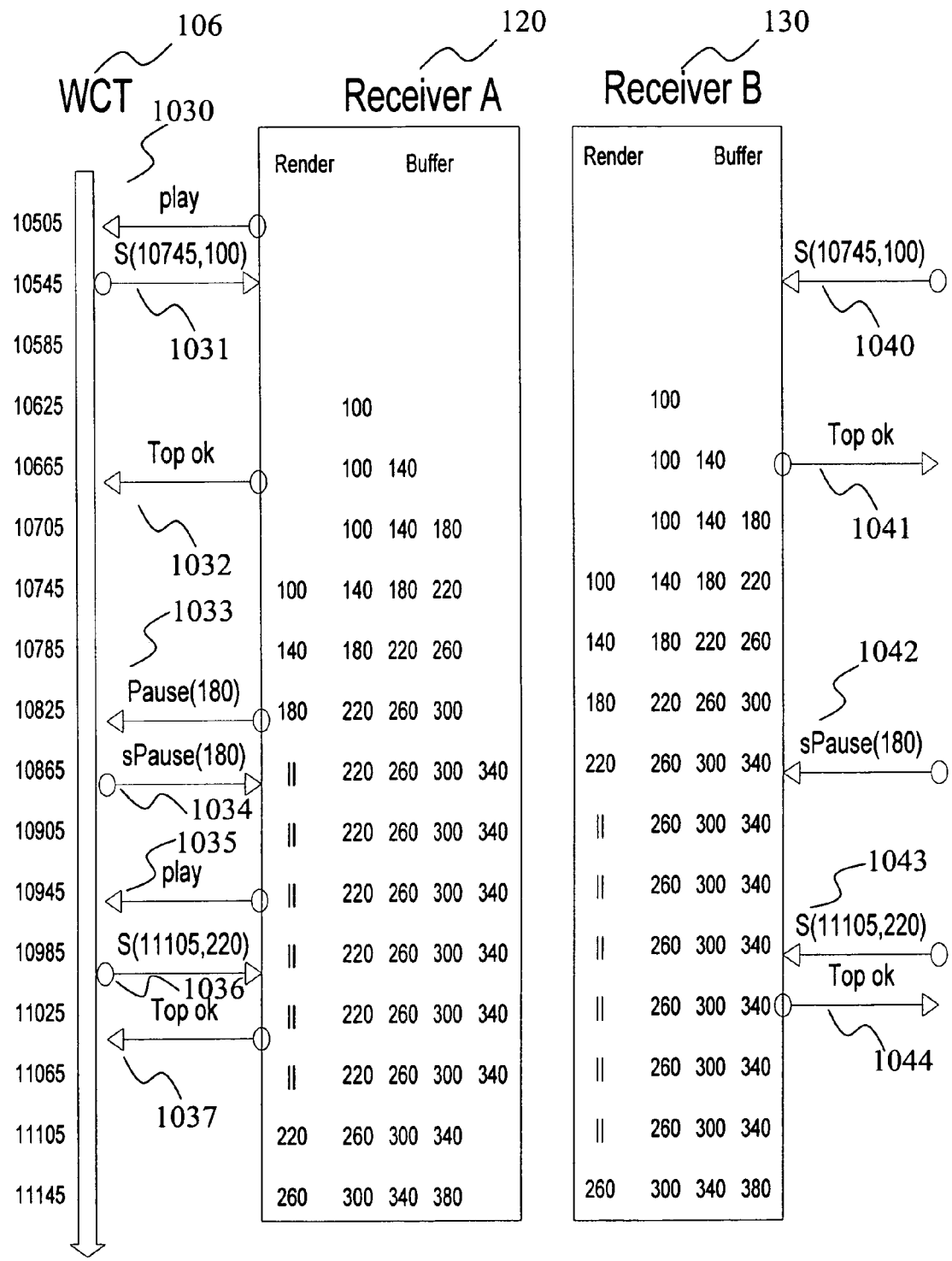
FIGS. 2 and 3 illustrate the functioning of two distinct embodiments of the invention, presented on a timeline.

FIG. 2 illustrates the dynamical behavior of devices according to a first embodiment of the methods of transmission and reception.

Streamer 102 sends an RTP (Real-time Transport Protocol, according to standard RFC 3550) digital content stream over an IP multicast connection. Receivers A and B correspond for example to receivers respectively 120 and 130 of FIG. 1. The timeline "WCT" (which stands for Wall Clock Time) corresponds to the common time reference 106 of FIG. 1. The common time reference WCT allows all receivers to be synchronized, that is, all receivers receive a same clock value at the same time. This time reference starts and stops with determined values. As exemplary illustrated, a determined start value is, for example, an arbitrary chosen value of 10505 ms and a determined stop value is an arbitrary chosen value of 11145 ms. The WCT value increases in a determined step (e.g. of 40 ms as illustrated). The determined step advantageously equals the inverse of the frame rate of the digital content in the case of the digital content being a video stream, comprising audio or not. (e.g. a determined step of 40 ms corresponds to an image frequency of 25 images per second, a commonly used image frequency in Europe. Of course, the invention does not impose that the increase step of the common time reference is the inverse of a digital content frame rate; the increase step value may depend on the desired precision for the digital content trick mode or on the digital content frame rate. For example, if a precision of 1 s is sufficient for defining a point in the digital content stream, the common time reference may be sent with an update frequency of 1 s, and thus a new value is sent every second; this has the advantage to allow a reduction of the bandwidth taken to send the common time reference signal.

According to a particular embodiment of the invention, the common time reference can be sent to receivers in the form of an NTP (Network Time Protocol) signal. The advantage of this feature is that NTP is reliable time synchronization protocol well known to the skilled in the art.

For sake of readability of the FIG. 2, the latter is focusing on time management and does not take into account that the images of the stream may arrive in disorder in the receiver; this problem is solved by for example the application of the RTP protocol, which allows assigning sequence numbers to packets inside an RTP packet, so that these packets can be reordered if received out of sequence. Packet-reordering is a technique that is commonly known to the skilled in the art. A player buffer of players A 122 and B 123 as represented in the figure illustrates the receiver's A 120 respectively B's 130 decoding buffer, that is, after packet reordering.

According to the illustrated particular embodiment of the invention, the identification point in the digital content stream identifies an image. According to another particular embodiment of the invention, the identification point in the digital content stream identifies an audio frame. This feature provides the advantage to allow a very fine resolution for positioning in the digital content stream, which can for example be desirable for image-by-image, respectively audio frame by audio frame stepping playback. In the illustrated embodiment, an image is sent every 40 ms, which corresponds to a digital content frame rate of 25 images/sec, as explained above.

According to the illustrated particular embodiment of the invention, the decoding buffer of receivers 120 and 130 has a size of respectively 3 and 4 images, represented by numbers 100 to 380 inside the receiver A 120 and receiver B 130 buffer space. The size of the buffer is kept small for the simplicity of the illustration. In practice, the decoding buffer size is determined according to different parameters such as the encoding format. The determination of a decoder buffer size is known to the skilled in the art.

According to a particular embodiment of the invention, the images are I (Infra coded), P (Predictive coded), or B (Bidirectional predictive coded) frames from an MPEG (Moving Pictures Expert Group, who defined multiple MPEG standards such as MPEG-2 and MPEG-4, respectively ISO/IEC 13818 and ISO/IEC 14496-10 standards) digital content stream.

According to another particular embodiment of the invention, the images are I (Intra coded) frames only from a lossless digital content encoded digital content stream.

For illustration purpose, at WCT equal to 10505, the player A 122 of receiver 120 sends a digital content trick mode message "play" 1030 to the digital content distribution server 100.

At WCT equal to 10545, the receivers A 120 and B 130 receive a scheduling message "S(10745, 100)" respectively 1031 for player A and 1040 for player B. This feature allows informing the receivers that the digital content stream is to be rendered from determined point 100 (image 100) at Determined WCT Value 10745.

At WCT equal to 10625, the receivers A 120 and B 130 both have received digital content stream point 100 (image 100), which is stored in a buffer.

At WCT equal to 10665, both receivers 120 and 130 have received digital content stream point 140 (image 140). Both receivers determine that they are ready to render the digital content from determined point 100 (image 100) at determined WCT value 10745, and thus send a notification message 'Top OK' respectively 1032 and 1041 to the digital content distribution server 100 (image 100) that indicate their readiness.

At WCT equal to 10705, receivers 120 and 130 have received the digital content stream points 100 (image 100), 140 (image 140) and 180 (image 180).

At WCT value equal to 10745, receivers 120 and 130 B have received digital content stream point 220 (image 220); digital content stream point 100 (image 100) is sent to digital content decoders comprised in receivers 120 and 130 and the digital content will be rendered on display 126 respectively 136 from point 100 (image 100). The buffer filling and sending to the decoder continues while the digital content stream is received.

At approximately WCT equal to 10825, receiver A 120 sends a 'pause (180)' digital content trick mode message 1033 to the digital content distribution server 100, which indicates to digital content distribution server 100 that the digital content streaming was paused by one of the receivers at digital content stream point 180 (here: image 180). The message is a command to stop the sending of the digital content stream. According to the received trick mode command message (i.e. here: pause), digital content distribution server stops streaming the digital content to all receivers. This feature allows saving digital content stream transmission bandwidth, since no receiver needs to receive the digital content stream any more; they will all receive a notification message indicating that one of the receivers requested the streaming to stop. Note that because the digital content stream was buffered by the receivers, they still have a part of the digital content stream in their buffers from after the point where the digital content pause was requested.

At WCT equal to 10865, receiver A 120 and B 130 both receive a notification message "sPause(180)" (for "set Pause") 1034 respectively 1042 from the server notifying them of the received trick mode command message. Receiver 130 receives the pause message when digital content point 220 (image 220) is currently displayed. Player B thus stops in turn its digital content rendering, but at image 220.

At WCT equal to 10945, receiver A 120 sends a "play" trick mode command message 1035 to digital content distribution server 100. Upon reception of this message, which is a trick mode command to start rendering of the digital content stream, the digital content distribution server starts the digital content stream sending as it was stopped before, and the receivers receive at WCT 10985 a message "S(11105, 220)" 1036 for player A and 1043 for player B which is scheduling information sent to all receivers meaning that the digital content stream is to be rendered from determined point 220 (here: image 220) at determined WCT value 11105. This feature allows all receivers to be informed that the rendering of the digital content stream is to be started from point 220 in the digital content stream at scheduled time 11105. According to the illustrated embodiment, all receivers are ready to render the digital content stream at the desired point at the desired time, and receivers A 120 and B 130 thus send 'top ok' messages respectively 1037 and 1044 at WCT 1025. Receiver A 120 that "freezed" the digital content stream rendering at point 180 (i.e. it continues to display point 180 as a still picture), continues stream decoding and rendering with the next point 220 at WCT 11105. Receiver B 130, that "freezed" digital content stream rendering at digital content stream point 220, waits until WCT 11145 to decode and render the next digital content stream point 260.

According to a particular embodiment of the invention, when no notification message 'top ok' has been received within a determined period of time from all of the receivers, a new scheduling message is sent with an increased WTC value. The WTC value is increased with a determined value, and the sending of the digital content stream is restarted from the point comprised in the received trick mode command message that is at the origin of the scheduling message. This feature allows postponing the scheduled time when one or more receivers are not ready to render the digital content stream at the desired time at the desired point. Doing so, synchronous rendering can be obtained at a later time when all of the receivers are ready to render the digital content stream at the desired point at the desired time.

According to a particular embodiment of the invention, determination that the receiver is ready to render said determined point in said digital content stream is based on an estimation of a time needed to fill a digital content reception buffer of the receiver.

According to a particular embodiment of the invention, the determined value with which the scheduled time is increased is obtained from measurements obtained from previous reception of 'top ok' messages. This feature allows adapting the delay to the expected needed delay time.

According to a particular embodiment of the invention, the determined time within no 'top ok' messages have been received is corrected with measurements obtained from previous reception of 'top ok' messages, so that the determined time can be adapted to the receivers that are connected to the digital content distribution server, and the number of needed rescheduling messages is thus reduced.

According to another particular embodiment of the invention, the identification point in the digital content stream identifies a transport packet used to transport the digital content stream. This feature has the advantage to need no specific modification of the digital content stream, but needs a memorization in the receiver of which image was packed into which transport packet.

According to another particular embodiment of the invention, the identification point in the digital content stream is a time stamp, such as a PTS (Presentation Time Stamp) in an MPEG-2 transport stream. This feature avoids modifying a digital content stream in order for it to be suitable for exploitation by the invention.

According to the illustrated particular embodiment of the invention, the identification point in the digital content stream identifies an image. This feature has the advantage to be a very precise identification of a point in the digital content stream, i.e. more precise even than PTS-based identification, but needs adaptation of the stream so that each image can be individually identified. As explained before, this feature provides the advantage to allow a very fine resolution for positioning in the digital content stream, which can for example be desirable for image-by-image stepping playback.

According to the invention, two or more above described variants for identifying a point in the digital content stream can be combined so as to propose a flexible identification of a point in a digital content stream that is particularly adapted to different types of receivers.

As illustrated here, the digital content stream is sent to the receivers in accordance with the trick mode command message that is received. This means that, for example, the digital content stream is not sent when a stop trick mode command is received, and that the digital content stream is sent from a specific point in the stream on a play command, and that the digital content stream is sent in fast forward mode from a specific point in the stream when a fast forward trick mode command is received.

Figure 3:
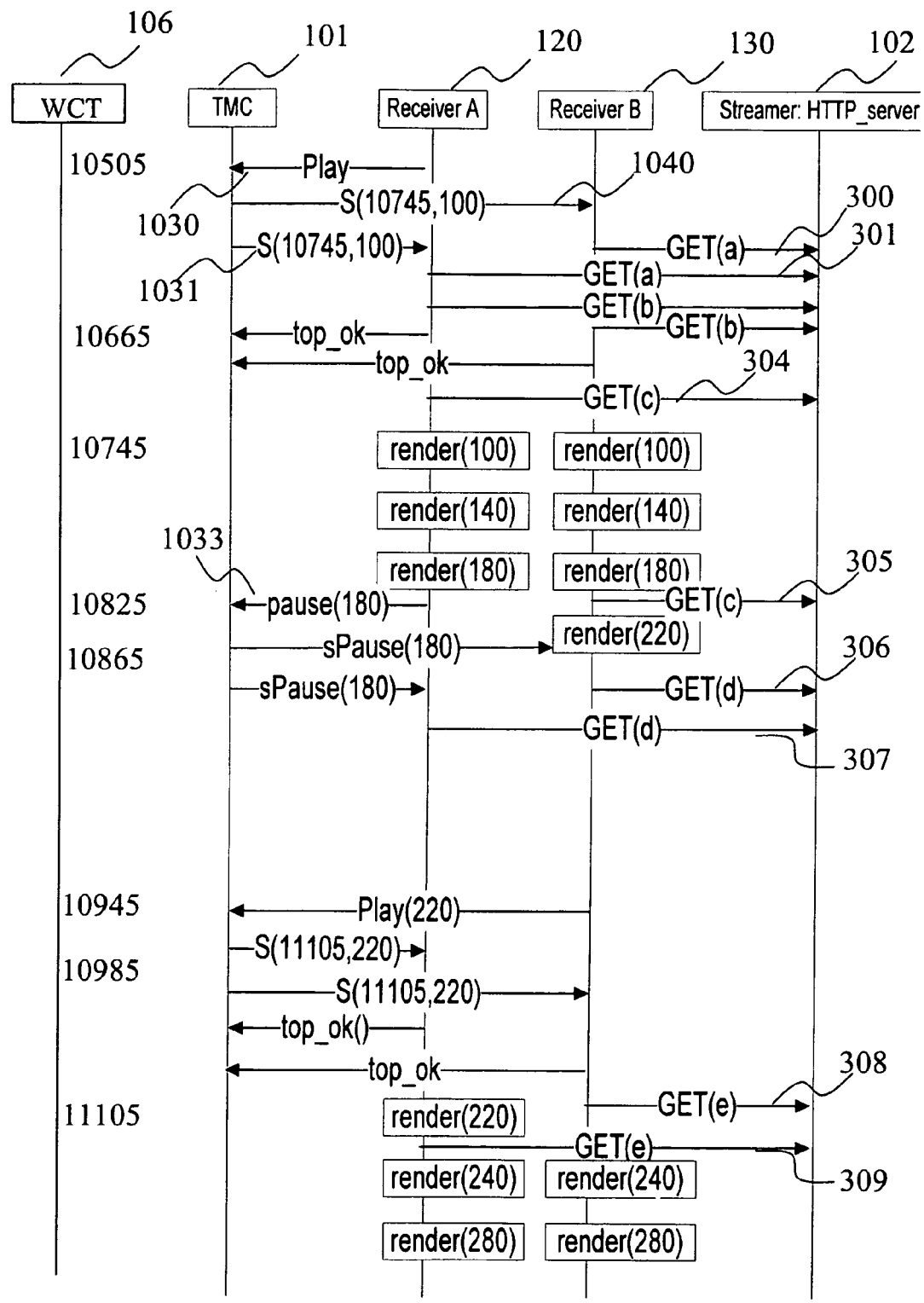

FIG. 3 illustrates a second embodiment of the methods of transmission and reception according to the invention In this figure, the dynamic behavior is represented in a sequence diagram. Vertical bar 106 represents the common time reference WCT. Vertical bar 101 represents the Digital content Trick Mode Controller 101. Vertical bar 120 represents receiver A. Vertical bar 130 represents receiver B. Vertical bar 102 represents digital content streamer 102. As for FIG. 2, the common time reference is represented Wall Clock Time WCT starts at arbitrary value 10505 and stops at arbitrary value 11145.

According to FIG. 3 the streamer 102 is a HTTP server sending the digital content stream upon HTTP (HyperText Transfer Protocol, according to standard RFC 2616) Get commands over individual IP unicast connections from each receiver 120 and 130 to the streamer. Each time that a receiver needs part of the digital content stream, it requests a send of the desired part to the HTTP streamer server 102. Each receiver decides autonomously what part of the digital content it needs to get from the http server 102 in order to avoid running out of data (also called starvation).

Each part, noted "a, b, c, d, e, f", contains a part of the digital content stream, one or more images, in pieces or entire, and not forcibly in read-order. The receivers 120 and 130 decode the part and have to make sure that they have a sufficient number of re-ordered images in their buffer. For example, the part "a" contains, in order, images 100, 180, 220, 140, and a part of 260. "b" contains the end of image 260 and images 340, 380 and a part of image 300, and so on. This explains that all receivers 120 and 130 acquire parts "a", "b", and "c" before sending a "top ok" message because they need image 300 before being capable of starting the decoding. Then, the receivers 120 and 130 request the parts that they need as a function of their needs.

The messages 1030-1037 and 1040-1044 have the same meaning as already described under FIG. 2 and will not be further described here. Messages 300-301 and 304-309 are http "get" type messages.

After having received scheduling message 1040, receiver 130 determines that it requires from streamer 102 to send part "a" that comprises point 100 of the digital content stream, with message 300. Receiver 120 does the same upon reception of scheduling message 1031 by sending message 301. Then, receivers 120 and 130 autonomously decide that they will also need parts "b" and "c", because they need to fill their digital content buffer in order to be ready to render the digital content stream from the desired point at the desired time, indicated by the scheduling messages 1040 and 1031.

At WCT equal to 10665, receivers 120 and 130 send 'top ok' messages to trick mode controller 101 to indicate that they are ready to render point 100 of the digital content stream at the scheduled WCT equal to 10745.

Between WCT 10665 and 10745, receiver 120 requests part "c" from streamer 102, indicated by message 304. This part is also requested at WCT equal to 10825 by receiver 130, indicated by message 305.

At WCT equal to 10745, receivers 120 and 130 have decoded digital content stream point 100 and are rendering it.

At WCT equal to 10825, receiver 120 sends a "pause" trick mode command message 1033 to trick mode controller 101.

At WCT equal to 10865, receiver 120 and receiver 130 receive a notification message from trick mode controller 101.

At WCT equal to 10945, receiver 120 sends a "play" digital content trick message to trick mode controller 101.

Between WCT 10865 and 10945, receivers 120 and 130 request digital content stream part "d" from streamer 102 by sending messages 306 and 307; they know they will need this part next when the stopped play will continue. This is an example of autonomous decision taking by the receivers, which are responsible for avoiding running out of digital content data.

At WCT 10985, receivers 120 and 130 receive scheduling messages to render point 220 at WTC equal to 11105. They both send 'top ok' notification messages to trick mode controller 101 and they both continue with requests 308 and 309 to streamer 102 to send part "e" of the digital content stream.

Figure 4:
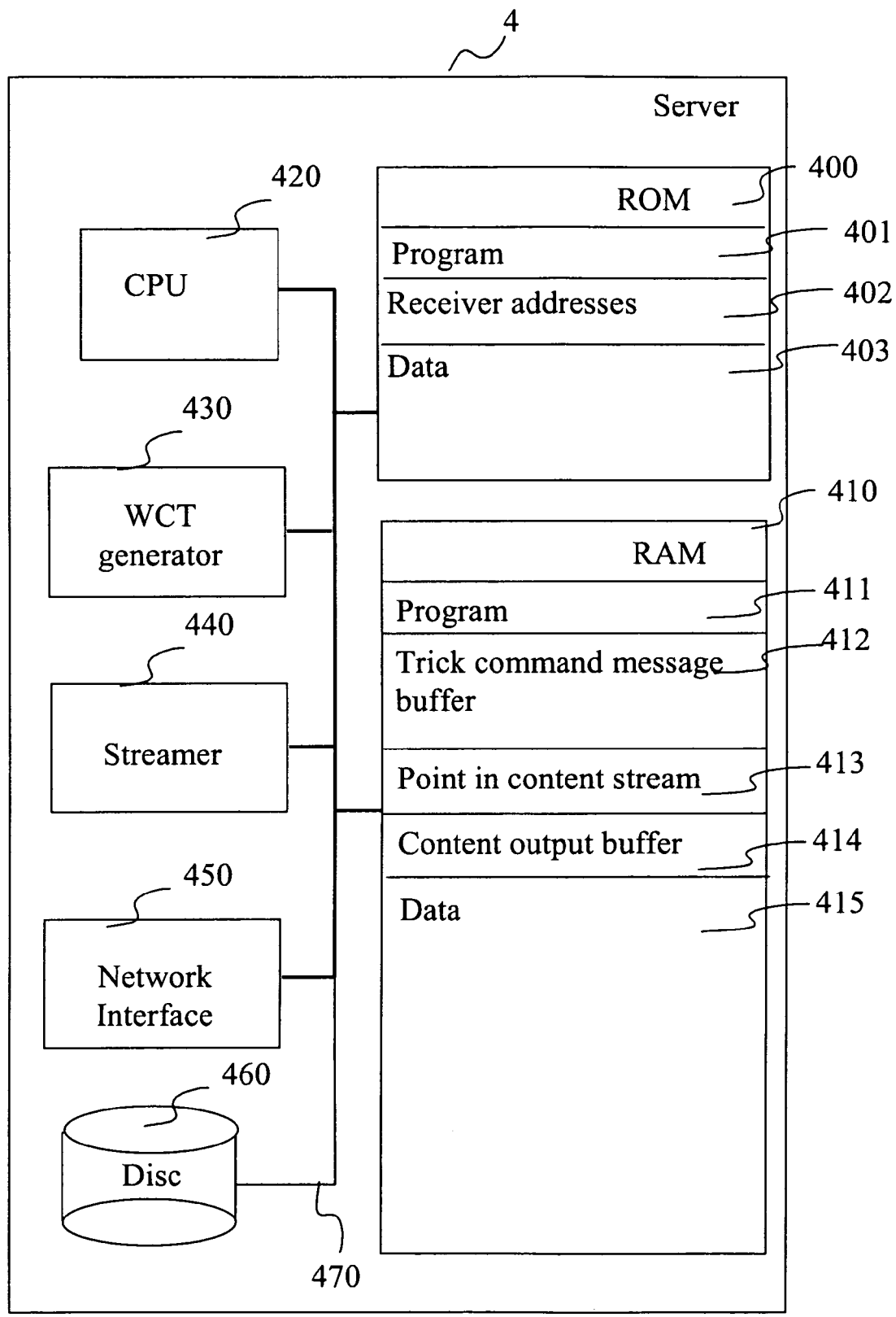
FIGS. 4 and 5 show particular embodiments of the invention implemented by respectively a server and a receiver of the network of FIG. 1.

FIG. 4 illustrates a digital content distribution server according a particular embodiment of the invention. The digital content distribution server corresponds for example to server 100 of FIG. 1. The digital content distribution server 4 comprises the following elements, interconnected by an address and data bus 470:
- a non-volatile memory of type ROM (<<Read Only Memory>>) 400;
- a read-write memory or RAM (<<Random Access Memory>>) 410;
- a microprocessor 420 (or CPU, for <<Central Processing Unit>>);
- a Wall Clock Time generator 430;
- a digital content streamer 440;
- a network interface 450; and
- a disc 460.

At power-on, the microprocessor 420 copies a program comprising the instructions of the algorithm implementing the steps of the method of transmission of a digital content stream to at least two receivers that is stored in the ROM 400 to RAM register 410 and executes them.

The Wall Clock Time generator 430 allows the server to send a common time reference to the receivers.

The digital content streamer 440 allows the server to send a digital content stream to the receivers.

The network interface 450 allows the server to receive and send messages and data over a network connection.

The disc 460 allows the server to comprise a mass-memory for the digital content streams that it can send to the receivers.

The word <<register>> used in the description of memories 400 and 410 means a low-capacity memory zone (only some binary data) or a high-capacity memory zone (allowing the storage of an entire program or of a large amount of data).

Each of the registers in ROM 400 and RAM 410 can hold a variable number of data of variable size. The read-only memory 400 comprises:
- a register 401, where the program is stored;
- a register 402, in which receiver device addresses are stored; and
- a register 403, in which receiver related data is stored.

The random-access memory 410 comprises:
- a register 411, used for storing the program that it is copied from ROM register 401;
- a register 412, used for storing received but not yet handled trick mode command messages;
- a register 413, used for retaining a point in the digital content stream comprised in the handled digital content trick mode messages; and
- a register 414, that contains a digital content output buffer, from which digital content stream output is sent to a receiver.
- a register 415 that contains data needed for the functioning of the program stored in RAM register 411, such as temporary variables and data tables.

Figure 5:
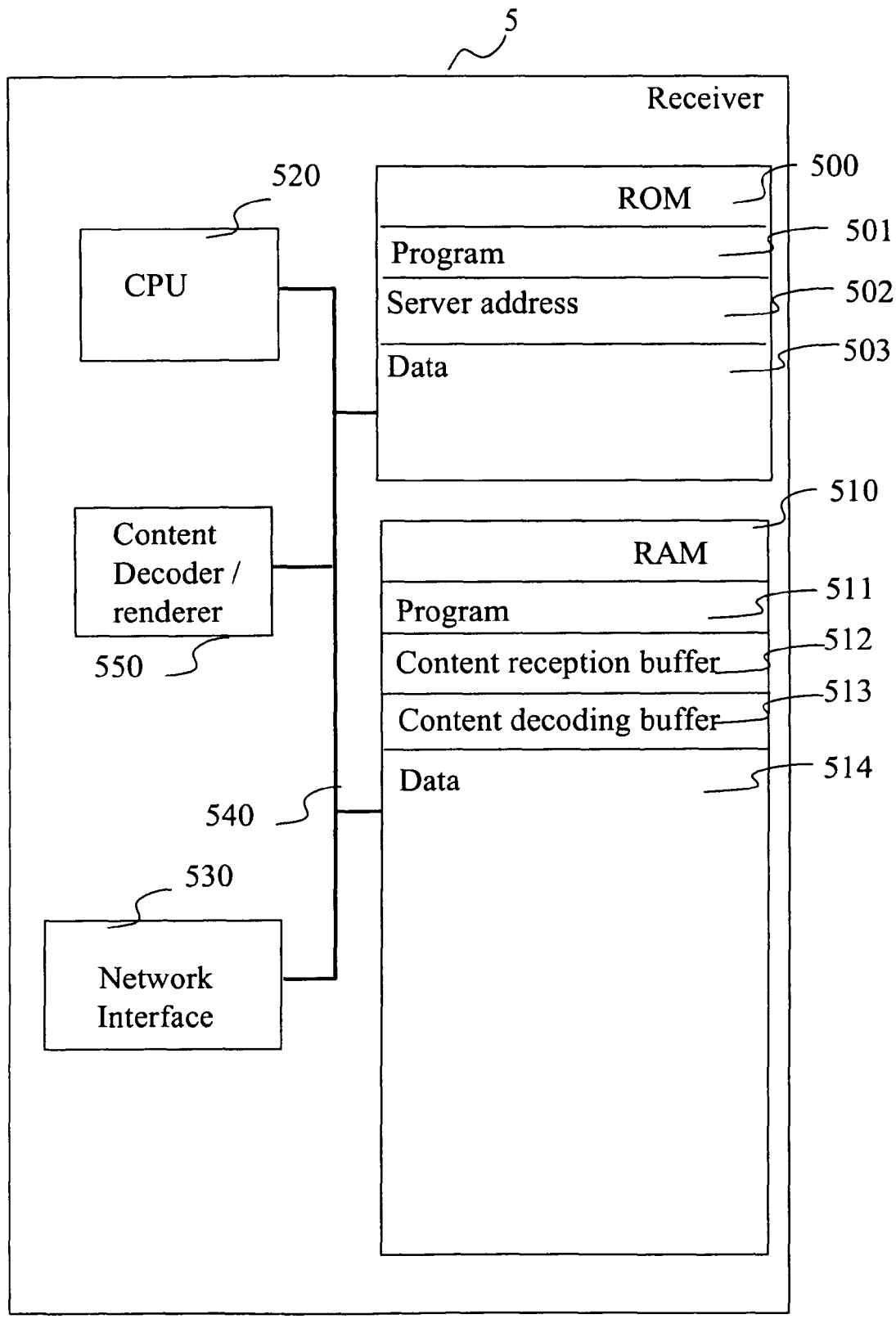

FIG. 5 illustrates a receiver according a particular embodiment of the invention. The receiver corresponds for example to receiver 120 or 130 of FIG. 1. The receiver 5 comprises the following elements, interconnected by an address and data bus 540:
- a non-volatile memory of type ROM (<<Read Only Memory>>) 500;
- a read-write memory or RAM (<<Random Access Memory>>) 510;
- a microprocessor 520 (or CPU, for <<Central Processing Unit>>)
- a digital content decoder/renderer 550; and
- a network interface 530.

At power-on, the microprocessor 520 copies a program comprising the instructions of the algorithm implementing the steps of the method of transmission of a digital content stream to at least two receivers that is stored in the ROM 500 to RAM register 510 and executes them.

The digital content decoder/renderer 550 allows the receiver to decode and render the received digital content stream on a display such as display 126 and 136 attached to decoders 120 respectively 130 of FIG. 1.

The network interface 530 allows the receiver to receive and send messages and data over a network connection.

The word <<register>> used in the description of memories 500 and 510 means a low-capacity memory zone (only some binary data) or a high-capacity memory zone (allowing the storage of an entire program or of a large amount of data).

Each of the registers in ROM 500 and RAM 510 can hold a variable number of data of variable size. The read-only memory 500 comprises:
- a register 501, where the program is stored;
- a register 502, in which digital content distribution server device addresses are stored; and
- a register 503, in which digital content distribution server related data is stored.

The random-access memory 510 comprises:
- a register 511, used for storing the program that it is copied from ROM register 501;

a register 512, used for buffering received digital content stream data before reordering;

a register 513, used for buffering received digital content stream data, after reordering and before decoding; and a register 514 that contains data needed for the functioning of the program stored in RAM register 511, such as temporary variables and data tables.

Figure 6:
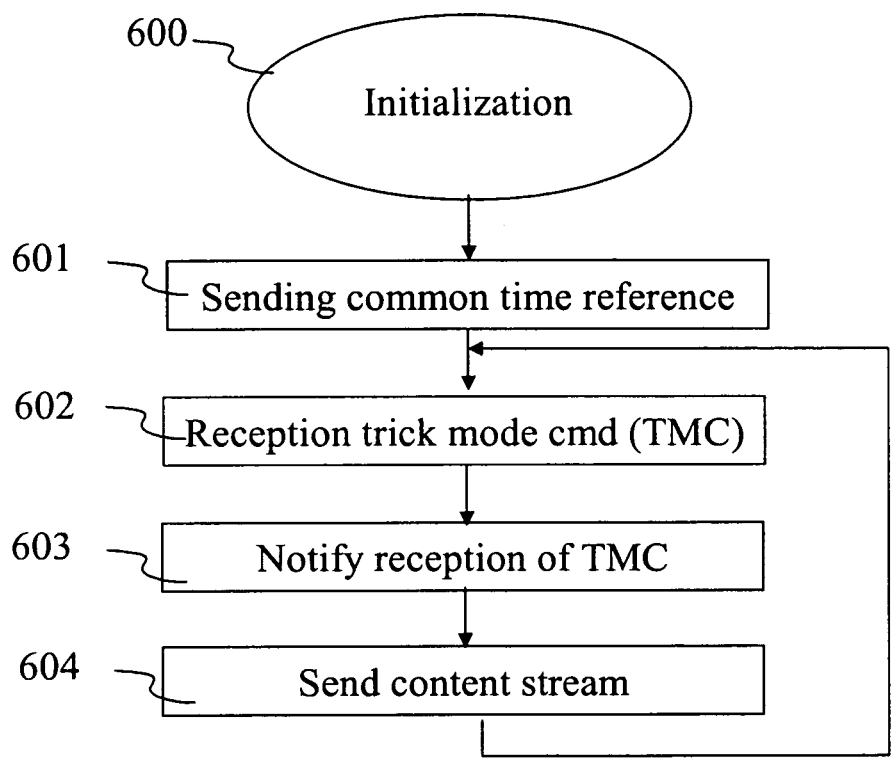
FIGS. 6 and 7 shows algorithms of a method of respectively a transmission of a digital content stream and of a corresponding method of reception, according to the invention, that can be implemented in respectively the server and the receiver of FIGS. 4 and 5.

FIG. 6 shows an algorithm of transmission of a digital content stream to at least two receivers according to a particular embodiment of the method of transmission of the invention, such as implemented by digital content distribution server 4 of FIG. 4.

The CPU 420 loads the program containing the algorithm from ROM memory 400 to RAM memory 410 and starts the program. The algorithm starts with initialization step 600, where all variables needed for the algorithm are initialized.

In step 601, a common time reference is sent to at least two receivers.

In step 602, trick mode command messages are received, where the received trick mode command messages comprise information allowing identification of a point in a digital content stream.

In step 603, notification messages are sent to all of the at least two receivers notifying them of the received trick mode command message.

In a step 604, at least a part of a digital content stream is sent to all of the at least two receivers in accordance with the received trick mode command message, where the digital content stream comprises information allowing to identify a point in the digital content stream.

Finally, the algorithm continues with step 602.

Figure 7:
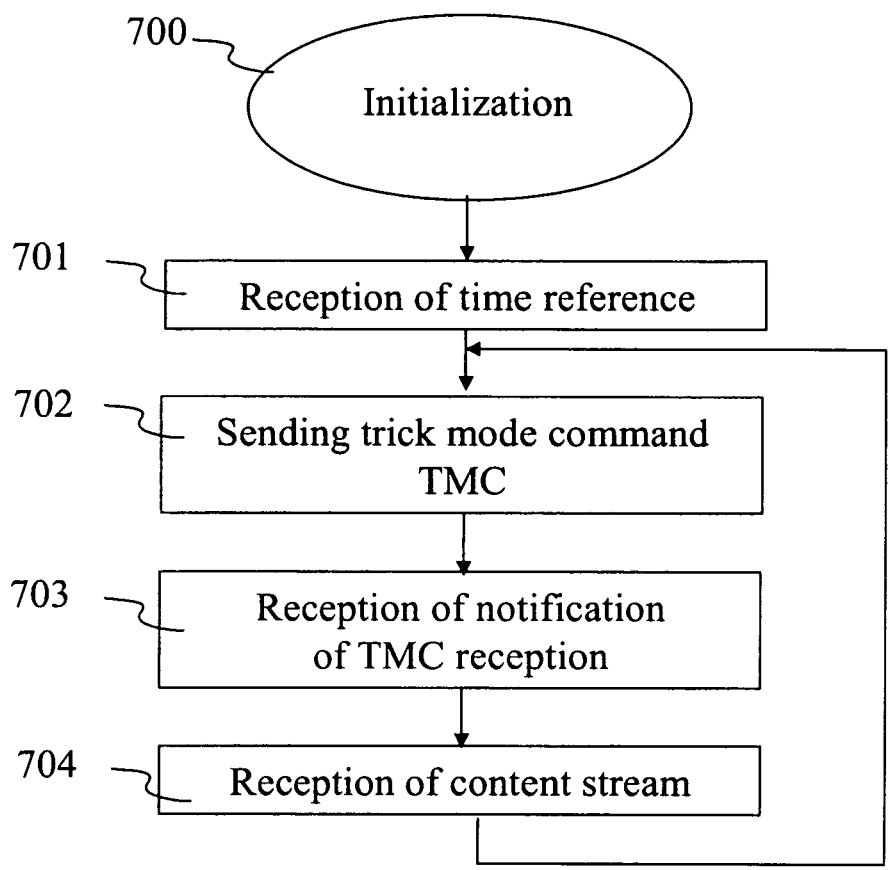

FIG. 7 shows an algorithm of reception of a digital content stream according to a particular embodiment of the method of reception of the invention, such as implemented by receiver 5 of FIG. 5.

The CPU 520 loads the program containing the algorithm from ROM memory 500 to RAM memory 510 and starts the program. The algorithm starts with initialization step 700, where all variables needed for the algorithm are initialized.

In step 701, a time reference is received.

In step 702, a trick mode command message is sent, where the trick mode command message comprises information allowing identification of a point in the digital content stream.

In step 703, a notification message is received notifying the receiver that a trick mode command message is received from a receiver.

In a step 704, a digital content stream is received in accordance with the received trick mode command notification message, where the digital content stream comprises information allowing to identified a point in the digital content stream.

Finally, the algorithm continues with step 702.

The reader of the present document will understand that the described embodiments are given as example embodiments of the invention, and thereby the invention is not limited to these embodiments.

The infrastructure of FIG. 1 is illustrated as an example embodiment. Other infrastructures are possible that are compatible with the invention, with additional or less devices; according to a particular embodiment of the invention, the operator network comprises other devices needed for its functioning: transmitter equipment, traffic management, scrambling management equipment. In a particular embodiment of the invention, other network equipment is needed comprising network switches and routers. According to a particular embodiment of the invention, a DSLAM (Digital Subscriber Line Access Multiplexer) is be present on the access network and the devices need an ADSL (Asynchronous Digital Subscriber Line) type modem, either external or internal, to connect to the transport network. According to a particular embodiment of the invention, different receivers access a same digital content distribution server via different transport networks. According to a particular embodiment of the invention, a receiver can be of a dedicated type, comprising an STB (Set Top Box) or a more generic type comprising a PC (Personal Computer). According to a particular embodiment of the invention, the infrastructure comprises more than two receivers. According to a particular embodiment of the invention, a receiver is connected to the transport network by means of a gateway, and other receivers are connected to the gateway in what is commonly called a home network.

The described embodiment of the digital content distribution server is an example of a possible implementation of the invention. Other implementations that are compatible with the invention are possible. The digital content distribution server can for example also be implemented using different hardware components for the different functions that it comprises. For example, the functions of streaming and digital content trick mode control can be separated. For example, the digital content trick mode control may comprise additional features that are necessary to provide access rights control, or management of the streams. For example, the digital content trick mode control may comprise encoders that allow it to encode a same digital content stream in different digital content encoding formats that are each adapted to a particular or to a set of particular receivers. For example, the WCT generator may be external to the digital content distribution server, which allows more than one digital content distribution server to cooperate using a same common time reference.

The trick mode commands illustrated in FIGS. 2 and 3 are given as example and are not to be considered as being limitative. Other types of trick mode commands than play, and pause are of course possible and are compatible with the methods of transmission and reception according to the invention, like seeking to a random point in the digital content stream (go to x), seeking to a specific point in the digital content stream (go to chapter), advance or rewind one or several images, skip n images, and more generally, a command that allows navigation in a digital content stream.

The application of the invention is not limited to the described applications, the digital content streaming can be done in the context of a Digital content-on-Demand application, a peer-to-peer digital content sharing application, an e-learning application, and more generally, the invention is suited to be used in any sort of application where a same digital content stream is shared between multiple receivers, and where the reception of digital content needs to synchronized over receivers, and where trick mode command from any receiver needs to be supported.

According to a particular embodiment of the invention, the network formed by receivers according to the invention is a peer-to-peer network. Then, even the digital content distribution server can be hosted by one of the peers, for example the peer that initiates a synchronized digital content transmission session. The digital content streamer of a digital content distribution server can, using the peer-to-peer distribution model, source the digital content to be streamed from the peer-to-peer network. The application of the invention to a peer-to-peer network has the advantages that a distributed digital content distribution model has over a centralized digital content distribution model, such as alleviating the load on a central digital content server.

According to a particular embodiment of the invention, the messages exchanged over the connections from the receivers to the digital content distribution server comply with the RTSP protocol (Real Time Streaming Protocol, RFC 2326).

According to a particular embodiment of the invention, the digital content distribution server transports the digital content stream using a one-to-many connection such as the IP multicast protocol.

According to yet another particular embodiment of the invention, the digital content distribution server transports the digital content stream over a one-to-one connection such as an IP unicast connection.

According to a particular embodiment of the invention, the digital content distribution server transports the digital content stream using a combination of one-to-many and one-to-one connections.

According to the particular embodiment, separate connections exist for the exchange of digital content trick mode messages and notification messages. According to a another particular embodiment of the invention, the messages from the digital content distribution server are sent over a single one-to-many connection, for example of the type IP multicast, whereas the messages from the receivers to the digital content distribution server are sent over separate one-to-one connections, such as IP unicast.

According to a particular embodiment of the invention, at least one of the receivers is a wireless receiver, for example a cellular telephone with digital content rendering capacity. A combination of wireless and wired receivers is perfectly possible with the invention, as long as all receivers implement the method of the invention.

According to a particular embodiment of the invention, the invention is applied in the context of operator-managed networks such as described by the IMS based NGN specifications in 3GPP and in TISPAN standard (IMS stands for IP Digital content Subsystem, an architectural framework for delivering internet protocol (IP) digital content to mobile users and Telecoms & Internet converged Services & Protocols for Advanced Networks (TISPAN), a standardization body of ETSI; NGN stands for Next Generation Networking, a broad term to describe some key architectural evolutions in telecommunication core and access networks that will be deployed around years 2013 to 2019; 3GPP stands for $3^{rd}$ Generation Partnership Project, a collaboration between groups of telecommunications associations). Then, the digital content distribution server is hosted by a provider. In the context of IMS, this can for example be in the form of one or more IMS MRF (Media Resource Function) functional entities. An MRF comprises a Media Resource Function Controller (MRFC) for processing the signaling and a Media resource Processor (MRFP) for processing the media transport. In the context of TISPAN and IPTV services that includes Content on Demand services, this can for example be in the form of similar entities as for IMS, here named IPTV Media functions that comprise an IPTV Media Control Function and one or more Media Delivery Function entities. In the above context of IMS/TISPAN, the provider initiates a digital content sharing session and invites invitees, for example some friends, to enter the digital content sharing session. Using the invention, all invitees share the same digital content, of which the images are rendered in a synchronized manner. All invitees can additionally issue trick mode commands, of which the results are shared.

According to a particular embodiment, the invention is applied in the context of non-operator-managed networks such as the internet.

According to a particular embodiment of the invention, a user interface is distributed to the receivers, that provides a screen area where the digital content stream is displayed as well as a screen area where trick mode command buttons are displayed, that give the user access to the sending of trick mode commands.

According to a particular embodiment of the invention, the user interface comprises an input element that gives random access to a point in the digital content stream, for example a knob that can be turned to the left and the right or a progress bar that indicates the current position of the digital content stream, and that can be repositioned by the user. Both type of elements allow a user of the interface to issue a seek type trick mode command to a random position in the digital content stream.

The invention claimed is:

1. A method of streaming of a same one-to-many digital content stream at a same time to at least two receivers, wherein the method comprises one-to-many streaming of said same one-to-many digital content stream and receiving, from said at least two receivers, of trick mode commands related to said streaming of a same one-to-many digital content stream to said at least two receivers, said method being implemented by a digital content trick mode controller, said method comprising:
sending of a common time reference to all of said at least two receivers;
reception, from one of said at least two receivers, of a trick mode command message related to said same one-to-many digital content stream for streaming at a same time to said at least two receivers, said received trick mode command message including at least one of stop, pause, fast reverse and fast forward and said received trick mode command message comprising information allowing identification of a point in said same one-to-many digital content stream to which said received trick mode command message applies;
sending, to all of said at least two receivers, of notification messages notifying them of said received trick mode command message related to said same one-to-many digital content stream for streaming at a same time to said at least two receivers, said notification messages comprising information allowing identification of a point in said same one-to-many digital content stream to which said received trick mode command message applies and controlling synchronous rendering of said same one-to-many content stream by said at least two receivers;
streaming of at least part of said same one-to-many digital content stream at a same time to all of said at least two receivers in accordance with the received trick mode command message providing synchronous rendering of said same one-to-many content stream by said at least two receivers;
said same one-to-many digital content stream comprising information allowing identification of said points in said same one-to-many digital content stream.

2. The method according to claim 1, wherein the method further comprises:
sending of a scheduling message to all of said at least two receivers in accordance with said received trick mode command message, said scheduling message comprising information for said all of said at least two receivers to render a determined point in said same one-to-many digital content stream at a determined value of said common time reference;
receiving of notification messages, from at least one of said at least two receivers indicating that it has determined that it is ready to render said determined point in said same one-to-many digital content stream at said determined value of said common time reference.

3. The method according to claim 2, wherein the method further comprises:
estimation of a time needed to fill a digital content reception buffer of said at least one of said at least two receivers; and
determination, that said at least one of said at least two receivers is ready to render said determined point in said same one-to-many digital content stream at said determined value of said common time reference, that is based on said estimation.

4. The method according to claim 1, wherein the method furthers comprises:
stopping said sending of at least a part of said same one-to-many digital content stream to all of said at least two receivers if said received trick mode command message is a command to stop a sending of said same one-to-many digital content stream.

5. The method according to claim 2, wherein the method further comprises:
when none of said notification messages have been received within a determined period of time from all of said at least two receivers,
a new scheduling message is sent wherein said determined value of said common time reference of a previous scheduling message is increased with a determined increase value, and
said sending of said at least a part of said same one-to-many digital content stream is restarted from a point comprised in said received trick mode command message.

6. The method according to claim 5, wherein the method further comprises determining said determined increase value from measurements obtained from previous reception of said notification messages.

7. A method of reception of a same one-to-many digital content stream streamed at a same time to at least two receivers, wherein the method comprises, implemented by each of said at least two receivers, further referred to as receiver:
reception of a time reference;
sending, from one of said at least two receivers, of a trick mode command message related to said same one-to-many digital content stream for streaming at a same time to said at least two receivers, said trick mode command message including at least one of stop, pause, fast reverse and fast forward and said received trick mode command message and comprising information allowing identification of a point in said same one-to-many digital content stream to which said sent trick mode command message applies;
reception of a notification message notifying said receiver that a trick mode command message related to said same one-to-many digital content stream for streaming at same time to said at least two receivers is received from said one of said at least two receivers, said received notification message comprising information allowing identification of said point in said one-to-many digital content stream to which said trick mode command message applies for synchronous rendering of said same one-to-many content stream with others of said at least two receivers;
reception of said same one-to-many digital content stream in accordance with said received notification message for synchronously rendering of said same one-to-many content stream with others of said at least two receivers, said same one-to-many digital content stream comprising information allowing identification of said points in said same one-to-many digital content stream for streaming at a same time to said at least two receivers, said points identifying one of a transport packet used to transport said same one-to-many digital content stream, an image, an audio frame, or a time stamp.

8. The method according to claim 7, wherein the method further comprises:
reception of a scheduling message, said scheduling message comprising information for said each of said at least two receivers to render a determined point in said same one-to-many digital content stream at a determined value of said time reference;
sending of a notification message indicating that said receiver has determined that it is ready to render said determined point in said same one-to-many digital content stream at said determined value of said time reference.

9. The method according to claim 8, wherein a determination that said receiver is ready to render said determined point in said same one-to-many digital content stream at said determined value of said time reference is based on an estimation of a time needed to fill a digital content reception buffer of said receiver.

10. The method according to claim 1, wherein said point in said digital content stream identifies a transport packet used to transport said digital content stream.

11. The method according to claim 1, wherein said point in said digital content stream identifies an image.

12. The method according to claim 1, wherein said point in said digital content stream identifies an audio frame.

13. The method according to claim 7, wherein said point in said digital content stream identifies a transport packet used to transport said digital content stream.

14. The method according to claim 7, wherein said point in said digital content stream identifies an image.

15. The method according to claim 7, wherein said point in said digital content stream identifies an audio frame.

16. A device for streaming of a same one-to-many digital content stream at a same time to at least two receivers, wherein the device receives, from said at least two receivers, trick mode commands related to said streaming of a same one-to-many digital content stream to said at least two receivers, said device comprising:
a storage register for storing a same one-to-many digital content stream;
a time generator for generating a common time reference;
a processor that transmits the common time reference to all of said at least two receivers, receives, from one of said at least two receivers, a trick mode command message related to said same one-to-many digital content stream for streaming at a same time to said at least two receivers, said received trick mode command message including at least one of stop, pause, fast reverse and fast forward and said received trick mode command message and comprising information allowing identification of a point in said same one-to-many digital content stream to which said received trick mode command message applies and sends, to all of said at least two receivers, notification messages notifying to said at least two receivers of said received trick mode command message related to said same one-to-many digital content stream for streaming at a same time to said at least two receivers, said notification messages comprising information allowing identification of a point in said same one-to-many digital content stream to which said received trick mode command message applies and controls synchronous rendering of said same one-to-many content stream by said at least two receivers; and a streamer that streams at least part of said same one-to-many digital content stream at a same time to all of said at least two receivers in accordance with the received trick mode command message providing synchronous rendering of said same one-to-many content stream by said at least two receivers;

said same one-to-many digital content stream comprising information allowing identification of said points in said same one-to-many digital content stream.

17. The device of claim 16, wherein the processor further sends a scheduling message to all of said at least two receivers in accordance with said received trick mode command message, said scheduling message comprising information for said all of said at least two receivers to render a determined point in said same one-to-many digital content stream at a determined value of said common time reference; and receives notification messages, from at least one of said at least two receivers indicating that it has determined that it is ready to render said determined point in said same one-to-many digital content stream at said determined value of said common time reference.

18. The device of claim 17, wherein the processor estimates a time needed to fill a digital content reception buffer of said at least one of said at least two receivers; and determines, that said at least one of said at least two receivers is ready to render said determined point in said same one-to-many digital content stream at said determined value of said common time reference, that is based on said estimation.

19. The device of claim 16, wherein the streamer stops said sending of at least a part of said same one-to-many digital content stream to all of said at least two receivers if said received trick mode command message is a command to stop a sending of said same one-to-many digital content stream.

20. The device of claim 17, when none of said notification messages have been received by the processor within a determined period of time from all of said at least two receivers, the processor sends a new scheduling message wherein said determined value of said common time reference of a previous scheduling message is increased with a determined increase value, and the streamer restarts sending of said at least a part of said same one-to-many digital content stream from a point comprised in said received trick mode command message.

21. The device of claim 20, wherein the processor determines said determined increase value from measurements obtained from previous reception of said notification messages.

22. The device of claim 16, wherein said point in said digital content stream identifies a transport packet used to transport said digital content stream.

23. The device of claim 16, wherein said point in said digital content stream identifies an image.

24. The device of claim 16, wherein said point in said digital content stream identifies an audio frame.

25. A receiver that receives a same one-to-many digital content stream streamed by a server at a same time to at least two receivers, said receiver comprising:

a network interface that receives a time reference from the server;

a processor configured to send via the network interface a trick mode command message related to said same one-to-many digital content stream streamed at a same time to the at least two receivers, said trick mode command message including at least one of stop, pause, fast reverse and fast forward and said received trick mode command message and comprising information allowing identification of a point in said same one-to-many digital content stream to which said sent trick mode command message applies and receive a notification message from the server indicating a trick mode command message related to said same one-to-many digital content stream for streaming at same time to said at least two receivers was received from one of said at least two receivers, said received notification message comprising information allowing identification of said point in said one-to-many digital content stream to which said trick mode command message applies for synchronous rendering of said same one-to-many content stream with others of said at least two receivers; and a content decoder for decoding and rendering the received same one-to-many digital content stream in accordance with said received notification message for synchronously rendering of said same one-to-many content stream with others of said at least two receivers, said same one-to-many digital content stream comprising information allowing identification of said points in said same one-to-many digital content stream for streaming at a same time to said at least two receivers, said points identifying one of a transport packet used to transport said same one-to-many digital content stream, an image, an audio frame, or a time stamp.

26. The device of claim 25, wherein the processor receives a scheduling message, said scheduling message comprising information for said each of said at least two receivers to render a determined point in said same one-to-many digital content stream at a determined value of said time reference; and sends a notification message indicating that said content decoder is ready to render said determined point in said same one-to-many digital content stream at said determined value of said time reference.

27. The device of claim 26, further comprising a digital content reception buffer for storing said same one-to-many digital content stream and the processor determines that said receiver is ready to render said determined point in said same one-to-many digital content stream at said determined value of said time reference based on an estimation of a time needed to fill a digital content reception buffer of said receiver.

28. The device of claim 25, wherein said point in said digital content stream identifies a transport packet used to transport said digital content stream.

29. The device of claim 25, wherein said point in said digital content stream identifies an image.

30. The device of claim 25, wherein said point in said digital content stream identifies an audio frame.

* * * * *